(12) United States Patent
Svenson et al.

(10) Patent No.: US 11,897,294 B2
(45) Date of Patent: Feb. 13, 2024

(54) TIRE HAVING A CONDUCTIVITY PATH

(71) Applicant: Bridgestone Americas Tire Operations, LLC, Nashville, TN (US)

(72) Inventors: Andrew J. Svenson, Wadsworth, OH (US); Justin M. Gehres, Uniontown, OH (US); Ruben L. Madrid, Copley, OH (US); Anup D. Khekare, Doylestown, OH (US); Seth M. Miller, Wooster, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 77 days.

(21) Appl. No.: 17/354,339

(22) Filed: Jun. 22, 2021

(65) Prior Publication Data

US 2021/0316575 A1    Oct. 14, 2021

Related U.S. Application Data

(63) Continuation of application No. 15/735,451, filed as application No. PCT/US2016/034098 on May 25, 2016, now abandoned.
(Continued)

(51) Int. Cl.
*B60C 19/08* (2006.01)
*B60C 9/02* (2006.01)
(Continued)

(52) U.S. Cl.
CPC .......... *B60C 19/084* (2013.01); *B60C 9/0007* (2013.01); *B60C 11/005* (2013.01);
(Continued)

(58) Field of Classification Search
CPC ... B60C 15/0036; B60C 19/08; B60C 19/082; B60C 19/084; B60C 19/086; B60C 19/088; B60C 15/0045
See application file for complete search history.

(56) References Cited

U.S. PATENT DOCUMENTS 2,650,641 A    9/1953   Hiatt et al.
4,545,927 A    10/1985  Railsback
(Continued)

FOREIGN PATENT DOCUMENTS

CN    101100160    1/2008
CN    101323234    9/2010
(Continued)

OTHER PUBLICATIONS

Machine translation of JP 2853816, 1999.*
(Continued)

*Primary Examiner* — Justin R Fischer
(74) *Attorney, Agent, or Firm* — Shaun J. Fox; Bryan J. Jaketic

(57) ABSTRACT

A tire includes a pair of beads and a crown region including a circumferential tread disposed radially above a circumferential belt. The tire further includes a pair sidewalls extending from the pair of beads to the crown region. A body ply wraps around the pair of beads and terminates in a pair of turn up ends in the crown region, below the middle 30% of the circumferential belt. A conductive substance is disposed along a strip of the body ply.

9 Claims, 3 Drawing Sheets

Related U.S. Application Data

(60) Provisional application No. 62/175,483, filed on Jun. 15, 2015.

(51) Int. Cl.
    *B60C 15/00* (2006.01)
    *B60C 11/00* (2006.01)
    *B60C 9/00* (2006.01)
    *B60C 19/12* (2006.01)

(52) U.S. Cl.
    CPC .......... *B60C 15/0045* (2013.01); *B60C 19/08* (2013.01); *B60C 19/082* (2013.01); *B60C 19/088* (2013.01); *B60C 19/12* (2013.01); *B60C 2009/0021* (2013.01)

(56) References Cited

U.S. PATENT DOCUMENTS

| | | | |
|---|---|---|---|
| 5,124,408 | A | 6/1992 | Engles |
| 5,173,135 | A | 12/1992 | Tokieda et al. |
| 5,183,594 | A | 2/1993 | Yoshinaka |
| 5,518,055 | A | 5/1996 | Teeple et al. |
| 5,714,533 | A | 2/1998 | Hatakeyama et al. |
| 5,872,171 | A | 2/1999 | Detrano |
| 6,289,958 | B1 | 9/2001 | Dheur et al. |
| 6,302,173 | B1 | 10/2001 | Mizuno et al. |
| 6,343,634 | B1 * | 2/2002 | Suzuki .................. B60C 19/08 152/DIG. 2 |
| 7,029,544 | B2 | 4/2006 | Lanzarotta et al. |
| 7,284,582 | B2 | 10/2007 | Zanzig et al. |
| 7,284,583 | B2 | 10/2007 | Zanzig et al. |
| 2003/0084982 | A1 | 5/2003 | Campbell |
| 2005/0087275 | A1 | 4/2005 | Zanzig et al. |
| 2006/0102264 | A1 | 5/2006 | Nicolas |
| 2007/0241987 | A1 * | 10/2007 | Kish .................. H01Q 1/2241 343/897 |
| 2010/0078102 | A1 | 4/2010 | Nakamura |
| 2011/0132649 | A1 | 6/2011 | Michelin |
| 2011/0259488 | A1 | 10/2011 | Zhao et al. |
| 2013/0056128 | A1 | 3/2013 | Kanz et al. |
| 2013/0092300 | A1 | 4/2013 | Sumitomo |
| 2014/0124117 | A1 | 5/2014 | Urata |
| 2014/0174612 | A1 | 6/2014 | Yoshikawa |
| 2014/0305567 | A1 | 10/2014 | Mitarai |
| 2015/0020943 | A1 | 1/2015 | Bridgestone |

FOREIGN PATENT DOCUMENTS

| | | | |
|---|---|---|---|
| DE | 4237297 | | 5/1994 |
| DE | 10025079 | * | 11/2001 |
| DE | 102007031274 | | 1/2009 |
| DE | 102013104114 | | 10/2014 |
| EP | 0196266 | | 1/1986 |
| EP | 718126 | | 6/1996 |
| EP | 754574 | | 1/1997 |
| EP | 881060 | | 12/1998 |
| EP | 1526005 | | 11/2006 |
| EP | 1738935 | | 1/2007 |
| EP | 2193939 | | 6/2010 |
| GB | 1013193 | | 12/1965 |
| JP | 52002902 | * | 1/1977 |
| JP | 1-293208 | * | 11/1989 |
| JP | 2853816 | * | 2/1999 |
| JP | 11059118 | * | 3/1999 |
| JP | 2005343217 | | 12/2005 |
| JP | 2013049418 | | 3/2013 |
| JP | 2013184551 | | 9/2013 |
| JP | 2013193577 | | 9/2013 |
| JP | 2013193579 | | 9/2013 |
| JP | 2013193580 | | 9/2013 |
| KR | 20080094981 | | 10/2008 |
| WO | 0124596 | | 4/2001 |
| WO | 0222382 | | 3/2002 |
| WO | 2013141693 | | 9/2013 |
| WO | 2014109169 | | 7/2014 |

OTHER PUBLICATIONS

Machine translation of DE 10025079, 2001.*
Machine translation of JP 52002902, 1977.*
International Search Report and Written Opinion; corresponding PCT Application No. PCT/US2016/034098 filed May 25, 2016; BAE, Guen Tae; Sep. 1, 2016.
Supplemental European Search Report; corresponding European Application No. EP16812125; Carneiro, Joaquim; Dec. 10, 2018.

* cited by examiner

TIRE HAVING A CONDUCTIVITY PATH

CROSS-REFERENCE TO RELATED APPLICATIONS

This application is a continuation of U.S. patent application Ser. No. 15/735,451 filed on Dec. 11, 2017, which in turn is a national stage entry of PCT/US16/34098, filed on May 25, 2016, which in turn claims the benefit of priority of U.S. Provisional Application No. 62/175,483, filed on Jun. 15, 2015, each of which is incorporated herein by reference in its entirety.

FIELD OF INVENTION

The present disclosure is directed to tires and tire treads featuring conductivity paths for conducting electric charge. More particularly, the present disclosure is directed to tires having a conductive substance disposed along a body ply.

BACKGROUND

Known tires contain materials that inhibit the conduction of electric charge. For example, tires having relatively high amounts of silica are known to accumulate static charge, which is undesirable for vehicle operation. Tires having relatively high amounts of silica previously used antennas to dissipate charge.

SUMMARY OF THE INVENTION

In one embodiment, a tire includes a tread and an undertread below the tread. A belt region is below the undertread. The tire further includes a pair of beads, each bead including a bead core and a bead filler. The tire further includes a pair of abrasion areas, each abrasion area being associated with one of the pair of beads. A body ply has a pair of turn up portions that wrap around the bead cores and the bead fillers and extend to the belt region of the tire. A pair of sidewalls are provided outside the body ply. Each sidewall extends between the tread and one of the abrasion areas. A metal filament extends from an area below a middle 30% of the belt region to at least one of the abrasion areas.

In another embodiment, a tire includes a pair of beads and a crown region. The crown region has a circumferential tread disposed radially above a circumferential belt. A pair of sidewalls extend from the pair of beads to the crown region. A body ply wraps around the pair of bead and terminates in a pair of turn up ends in the crown region. Each of the pair of turn up ends is located below the middle 30% of the circumferential belt. A metal filament extends from the crown region, down one of the pair of sidewalls, around one of the pair of beads, up the one of the pair of sidewalls, and back into the crown region below the circumferential belt. The metal filament is disposed along 40-60% of the length of the body ply.

In yet another embodiment, a tire includes a circumferential tread and a circumferential belt disposed radially below the circumferential tread. The tire further includes a first annular bead and a second annular bead. A first sidewall extends between the first annular bead and a first shoulder. The first shoulder is associated with the circumferential tread. A second sidewall extends between the second annular bead and a second shoulder. The second shoulder is associated with the circumferential tread. A body ply extends between the first annular bead and the second annular bead. The body ply further extends around the first annular bead, and forms a first turn up portion that extends through the first sidewall, over the first shoulder, and below at least 20% of the width of the circumferential belt. The body ply further extends around the second annular bead, and form a a second turn up portion that extends through the second sidewall, over the second shoulder, and below at least 20% of the width of the circumferential belt. A metal filament is disposed radially between the circumferential tread and the body ply. The metal filament wraps around the first annular bead. The metal filament is disposed along 40-60% of the length of the body ply.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and normal load.

"Tread width" refers to the width of the ground contact area of a tread which contacts with road surface during the rotation of the tire under normal inflation and load.

While similar terms used in the following descriptions describe common tire components, it is understood that because the terms carry slightly different connotations, one of ordinary skill in the art would not consider any one of the following terms to be purely interchangeable with another term used to describe a common tire component.

Figure 1:
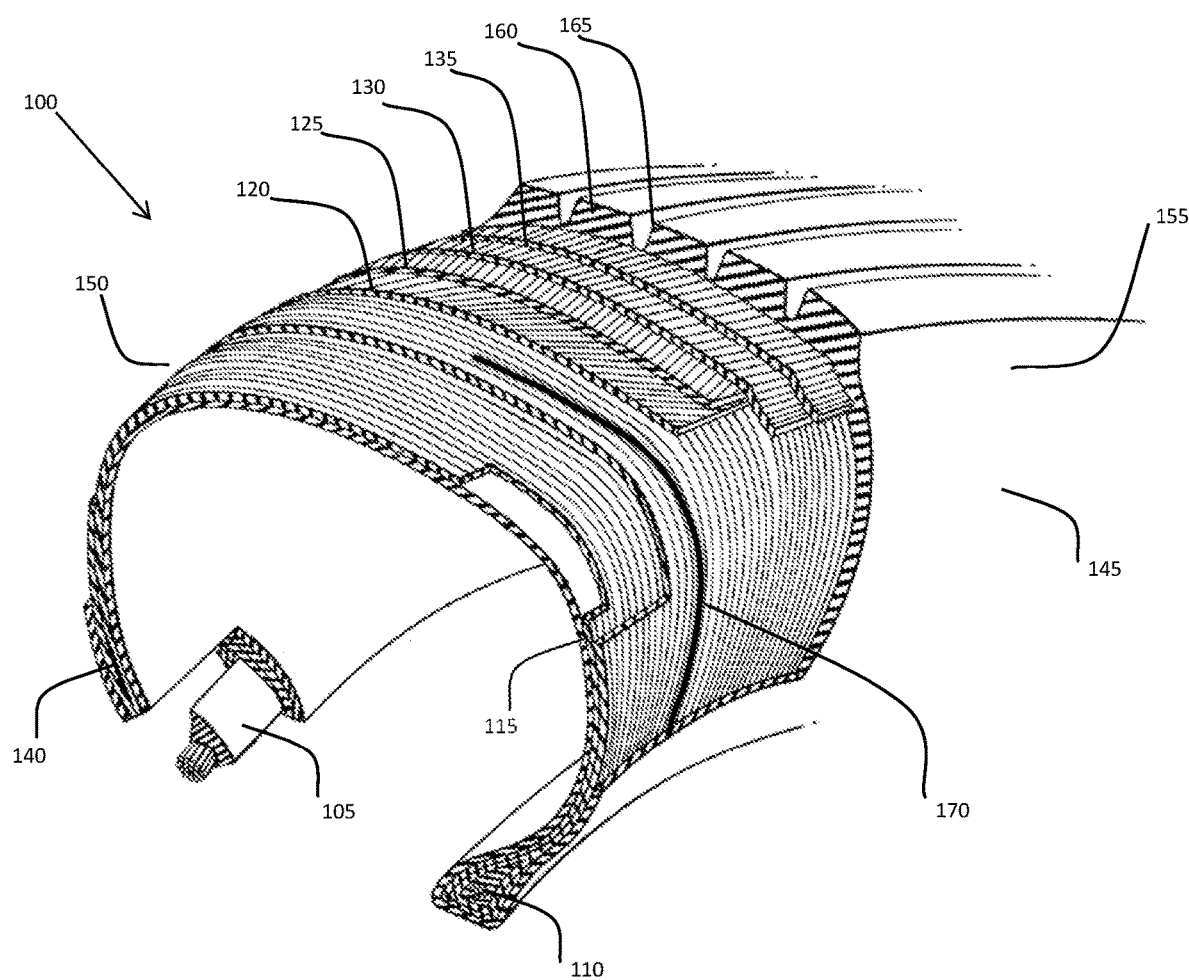
FIG. 1 is a peel-away perspective view of one embodiment of a tire having a conductivity path.

FIG. 1 is a peel-away perspective view of one embodiment of a tire 100. As shown, tire 100 features a first annular bead region 105 and a second annular bead region 110. Each bead region includes a bead core and a bead filler. The annular beads, in part, secure the tire to a wheel. In an alternative embodiment (not shown), the tire comprises four or more beads.

The tire 100 further includes a body ply 115, which imparts shape to the tire and wraps around the first annular bead 105 and the second annular bead 110. In the illustrated embodiment, turn up portions of the body ply 115 terminate in the bead regions of the tire. In alternative embodiments, turn up portions of the body ply may extend upwards and terminate in the sidewall regions or crown regions of the tire. As one of ordinary skill in the art will understand, body ply 115 may contain reinforcing cords or fabric (not shown). In an alternative embodiment (not shown), multiple body plies are utilized.

A circumferential belt 120 is disposed radially upward of the body ply 115 and extends axially across a portion of body ply 115. As one of ordinary skill in the art will understand, circumferential belt 120 may contain steel cords and reinforcing cords (both not shown). In an alternative embodiment (not shown), the circumferential belt lacks metal.

A reinforcement ply 125 is disposed radially above the circumferential belt 120 and extends axially across a portion of body ply 115. As one of ordinary skill will understand, additional reinforcement plies may be utilized. The reinforcement plies strengthen and stabilize the tire. In alternative embodiments (not shown), the tire contains one or three or more reinforcement plies. In another embodiment, the reinforcement plies are omitted.

A cap ply 130 is disposed radially above circumferential belt 120 and reinforcement ply 125. Cap ply 130 extends axially across a portion of body ply 115. In an alternative embodiment (not shown), a sealing gel layer is provided in the cap ply region.

The tire 100 also includes an undertread 135 disposed radially above circumferential belt 120 and cap ply 130. The undertread 135 extends axially across a portion of body ply 115. An undertread is typically comprised of rubber, and its thickness may vary depending on the tire application. For instance, in retreading applications, a thicker undertread is desired to accommodate buffing. In passenger tire applications, by comparison, a thinner undertread is desired.

The tire 100 further includes a first sidewall 140 and a second sidewall 145. First sidewall 140 extends between the first annular bead 105 and a first shoulder 150. Second sidewall 145 extends between the second annular bead 110 and a second shoulder 155.

Both the first and second shoulders 150, 155 are proximately associated with opposite edges of circumferential tread 160. In the illustrated embodiment, the circumferential tread 160 is separated by circumferential grooves 165, which divide circumferential tread 160 into five ribs. However, it should be understood that the circumferential tread may include any combination of grooves, ribs, block, lugs, or other tread elements. In most applications, the circumferential tread is affixed to the tire when the tire is new. In an alternative embodiment, the circumferential tread is affixed as a retread.

The tire 100 further includes a conductive filament 170. The conductive filament 170 is disposed radially between the circumferential tread 160 and the body ply 115. In the illustrated embodiment, the conductive filament 170 has a first end located in the center of the tread region of the tire 100, and the conductive filament 170 terminates at a second end located in the second annular bead region 110 of the tire 100. In other embodiments, the conductive filament has a first end located anywhere between the first bead region of the tire and the second belt edge of the tire, and the conductive filament terminates at the second bead region of the tire. While a bead-to-bead configuration would provide a maximum conductivity path for a given filament, a bead-to-belt edge may provide an adequate conductivity path for a given tire.

In one particular embodiment, the conductive filament 170 extends from a region within the middle 80% of the width of the circumferential tread 160, over body ply 115 and through the second shoulder region 155 and second sidewall region 145, to an abrasion area associated with the second annular bead 110. As one of ordinary skill in the art will understand, the abrasion area is a rubber region that is situated between the body ply and a wheel rim. In alternative embodiments (not shown), the conductive filament has a first end located in the first shoulder region, the first sidewall, or the first abrasion area associated with the first annular bead, with the second end of the filament located in the second abrasion area.

With continued reference to FIG. 1, the conductive filament 170 is disposed on top of the body ply 115. In one embodiment, the conductive filament 170 is placed on the body ply and then vulcanized into the tire. In yet another embodiment, adhesive is placed on the conductive filament, the conductive filament is then placed on the body ply, and then the conductive filament and body ply are vulcanized. In alternative embodiments, the conductive filament is woven through the body ply cords.

In another embodiment (not shown), the tire further comprises a second conductive filament that extends from a region within the middle 80% of the width of the circumferential tread, over a body ply and through the second shoulder region and second sidewall region, to the abrasion area associated with the second annular bead. In this embodiment, the second conductive filament is circumferentially opposite the conductive filament. Thus, approximately 170-190° separate the first and second filaments.

In yet another embodiment (also not shown), the tire further comprises a second conductive filament and a third conductive filament. In this embodiment, the second and third conductive filaments are disposed generally equidistantly around a tire circumference. Thus, approximately 110-130° separate the first, second, and third filaments. In other embodiments, any number of conductive filaments may be employed. The conductive filaments may be regularly spaced about the tire, or they may be irregularly spaced about the tire. In other embodiments, any number of conductive filaments may be employed.

The conductive filament 170 may be constructed from a variety of materials. In one embodiment, the conductive filament is metal. In one particular embodiment, the filament comprises at least 50% copper. In another alternative embodiment, the filament is constructed of a nylon core and silver coating. In yet another alternative embodiment, the conductive filament comprises a metal core and conductive rubber coating. In still another embodiment, the conductive filament may be constructed of metals that dissolve during production of the tire, leaving a metallic trace of the filament. In yet another alternative embodiment, the conductive filament may be an organic filament. For example, a conductive organic filament may be constructed of carbon nanotubes, polyaniline, or other conductive organic materials. In any of the above described embodiments, the conductive filament may have conductivity between $1.0 \times 10^7$ and $8.0 \times 10^{7\circ}$.

While the embodiment shown in FIG. 1 includes a conductive filament 170, it should be understood that the conductive filament may be replaced with other conductive substances that form a conductive path. For example, the conductive path may be formed by a metallic powder. Such a metallic powder may be disposed on an adhesive strip or suspended within an adhesive. As one of ordinary skill in the art will understand, varying the concentration of conductive powder in the adhesive will affect the conductivity of the conductive power suspension. In other embodiments, the conductive path may be formed by a conductive material that is applied to a body ply by an atomized spray. In still other embodiments, the conductive filament 170 may be replaced with a conductive rubber strip 310.

Figure 2:
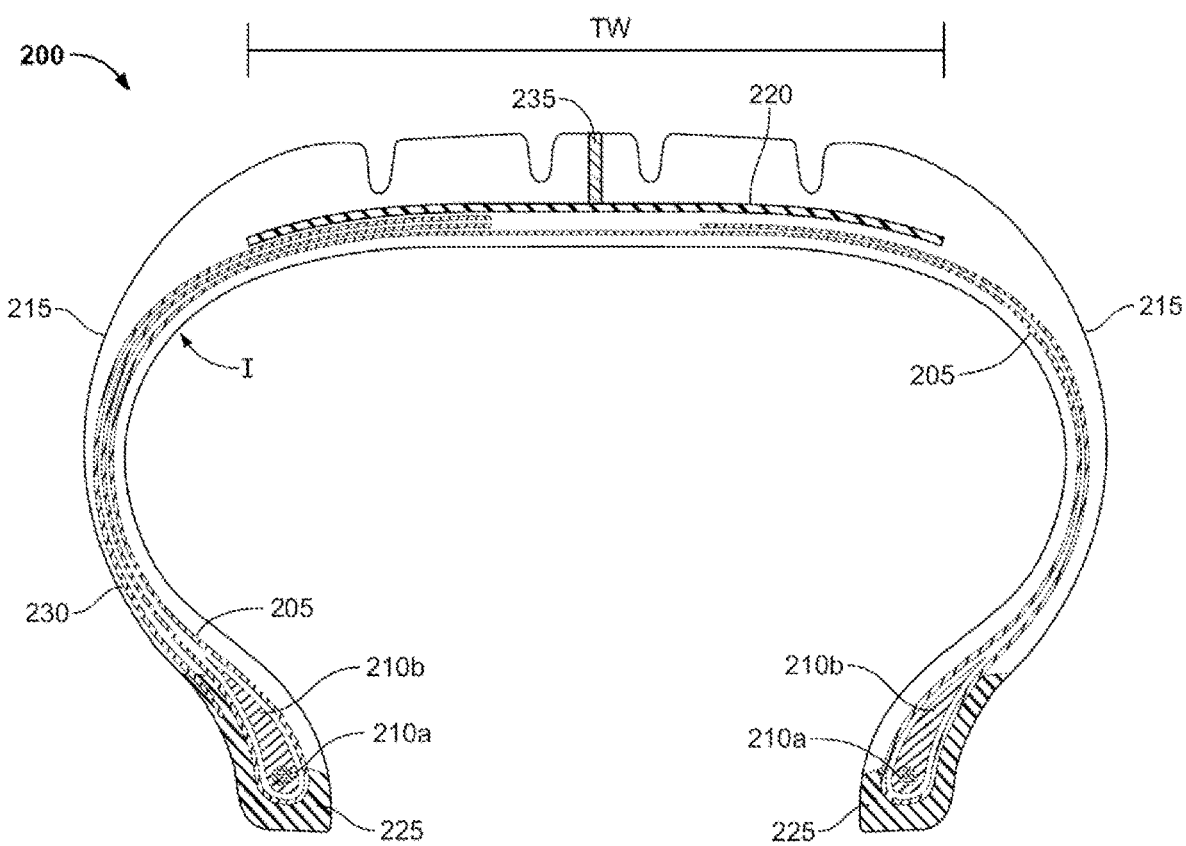
FIG. 2 is a schematic drawing of a cross-section of an alternative embodiment of a tire having a conductivity path.

FIG. 2 is a schematic drawing of a cross-section of an alternative embodiment of a tire featuring a conductivity path. The tire 200 includes a body ply 205 that wraps around bead cores 210*a* and bead fillers 210*b* and has turn up portions that extend through a sidewall region 215 and into a crown region of the tire 200, below a circumferential belt 220. An innerliner I is disposed on the radial interior of tire 200.

In wrapping around the bead cores 210, body ply 205 extends through abrasion area 225. Abrasion area 225 is a rubber that is conductive relative to sidewall 215. Thus, electric charge leaves from tire 200, through abrasion area 225, to a wheel (not shown). In one embodiment, sidewalls 215 have a thin gauge—a gauge between 0.08 inches (2 mm) and 0.15 inches (4 mm). The sidewalls 215 may be made from a rubber having 25-40 parts per hundred rubber ("phr") carbon black. As one skilled in the art will understand, while sidewalls with a thin gauge have desirable rolling resistance attributes, such sidewalls may have undesirable conductivity attributes.

While the circumferential belt 220 is illustrated as a single layer in the schematic representation of FIG. 2, it should be understood that this schematic representation may include multiple belt layers, one or more cap plies, or an undertread. By terminating in the crown region of the tire, the body ply 205 overlaps itself within the tread width TW. In one embodiment, the body ply overlaps itself over 10-40% of the tread width. In one particular embodiment, a first turn up portion extends through the first sidewall, over the first shoulder, and below at least 20% of the width of the circumferential belt 220 and a second turn up portion extends through the second sidewall, over the second shoulder, and below at least 20% of the width of the circumferential belt 220. In another embodiment, the body ply overlaps itself over 30-60% of the tread with. In a yet another embodiment, the body ply overlaps itself over 55-100% of the tread width.

Tire 200 further includes a conductive path 230 that extends from the abrasion area 225 to the undertread, between sidewall 215 and body ply 205, to an area under the tread. In one embodiment, the conductive path is a metallic filament, such as a metallic filament described above with respect to the embodiment shown in FIG. 1. In an alternative embodiment, the conductive path may be formed by a metallic powder. Such a metallic powder may be disposed on an adhesive strip or suspended within an adhesive. In other embodiments, the conductive path may be formed by a conductive material that is applied to a body ply by an atomized spray.

While FIG. 2 depicts a single conductive path 230 on one side of the tire 200, it should be understood that multiple conductive paths may be located about the tire. The conductive paths may be located on a single side of the tire or on both sides of the tire. The tire 200 further comprises an antenna 235. In the illustrated embodiment, antenna 235 is disposed on the middle rib, but it is not limited to a particular location on the tread, and multiple antennas can be used. Antenna 235 extends from the tread surface to the undertread. Antenna 235 is constructed of a relatively conductive compound that allows electric charge to leave tire 200. In one embodiment, the conductive antenna has a width between 3-6% of the tread width TW. In another embodiment, the tire lacks a conductive antenna.

Figure 3:
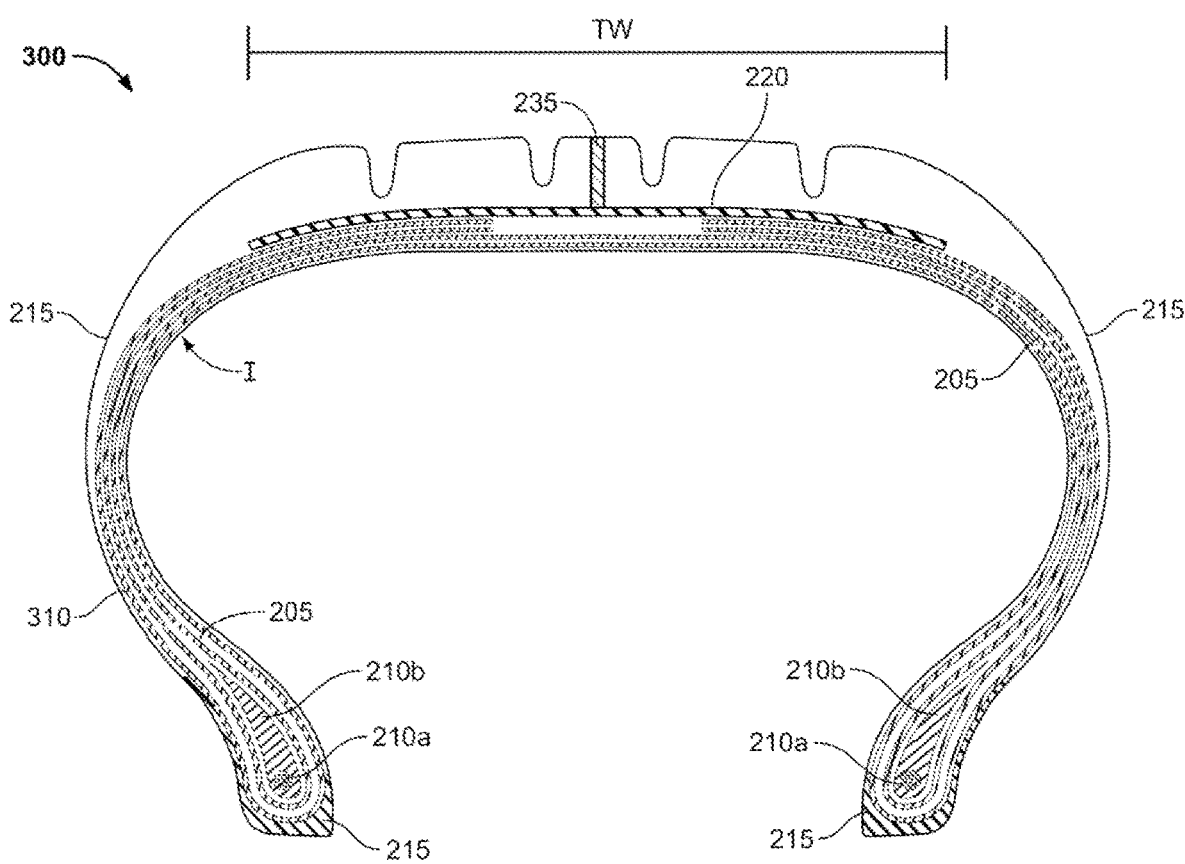
FIG. 3 is a schematic drawing of a cross-section of another alternative embodiment of a tire having a conductivity path.

FIG. 3 is a schematic drawing of a cross-section of another alternative embodiment of a tire 300 featuring a conductivity path. The tire 300 is substantially the same as the tire 200 of FIG. 2 except for the differences described herein. Like reference numerals are used for like elements.

The tire 300 includes a body ply 205, that wraps around bead cores 210*a*, bead fillers 210*b*, through a sidewall region 215 and into a crown region of the tire 300, below a circumferential belt 220. In this embodiment, a conductive path 310 extends from one end of the body ply to the other. In other words, the conductive path extends through the entire crown region, down the sidewall region, wraps around the bead cores 210*a* and bead fillers 210*b*, through the sidewall region 215 and back into the crown region of the tire 300 below the circumferential belt 220. In such an embodiment, the conductive path extends from a first abrasion area associated with the first annular bead over the first shoulder and the second shoulder, to and a second abrasion area associated with the second annular bead.

By terminating in the crown region of the tire, the conductive path 215 overlaps itself within the tread width TW. In one embodiment, the conductive path overlaps itself over 10-40% of the tread width. In another embodiment, the conductive path overlaps itself over 30-60% of the tread with. In a different embodiment, the conductive path overlaps itself over 55-100% of the tread width.

While several components of a tire are described above, it should be understood that additional components may be employed. For example, various inserts and reinforcements may be employed in different regions of the tire. In other embodiments, the tire may be a non-pneumatic tire.

As one of ordinary skill in the art would understand, the tire embodiments described in this disclosure may be configured for use on a vehicle selected from the group consisting of motorcycles, tractors, agricultural vehicles, lawnmowers, golf carts, scooters, airplanes, military vehicles, passenger vehicles, hybrid vehicles, high-performance vehicles, sport-utility vehicles, light trucks, heavy trucks, heavy-duty vehicles, and buses. One of ordinary skill in the art would also understand that the embodiments described in this disclosure may be utilized with a variety of tread patterns, including, without limitation, symmetrical, asymmetrical, directional, studded, and stud-less tread patterns. One of ordinary skill in the art would also understand that the embodiments described in this disclosure may be utilized, without limitation, in high-performance, winter, all-season, touring, non-pneumatic, and retread tire applications.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising
a pair of beads;
a crown region including a circumferential tread disposed radially above a circumferential belt;
a pair of sidewalls extending from the pair of beads to the crown region;
a body ply that wraps around the pair of bead and terminates in a pair of turn up ends in the crown region, each of the pair of turn up ends being located below the middle 30% of the circumferential belt;
a metal filament extending from the crown region, down one of the pair of sidewalls, around one of the pair of beads, up the one of the pair of sidewalls, and back into the crown region below the circumferential belt, the metal filament being disposed along 40-60% of the length of the body ply.

2. The tire of claim 1, further comprising a pair of abrasion areas, each abrasion area being associated with one of the pair of beads.

3. The tire of claim 2, wherein the tire further comprises a third metal filament, the second and third metal filaments being disposed generally equidistantly around a tire circumference.

4. The tire of claim 1, wherein the tire further comprises a second metal filament disposed radially between the circumferential tread and the body ply.

5. The tire of claim 1, wherein the metal filament is composed of at least 50% copper.

6. The tire of claim 1, wherein the metal filament includes a nylon core and silver coating.

7. The tire of claim 1, wherein the metal filament includes a metal core and conductive rubber coating.

8. The tire of claim 1, wherein the metal filament has conductivity between $1.0 \times 10^7$ and $8.0 \times 10^7$ σ-cm.

9. The tire of claim 1, further comprising a non-conductive sealing gel disposed above the circumferential belt.

* * * * *